June 30, 1925.

M. HUTCHINSON 1,544,456

WOODWORKING MACHINE

Filed June 15, 1923    4 Sheets-Sheet 1

June 30, 1925.

M. HUTCHINSON 1,544,456

WOODWORKING MACHINE

Filed June 15, 1923

M. HUTCHINSON

WOODWORKING MACHINE

Filed June 15, 1923   4 Sheets-Sheet 4

Patented June 30, 1925.

1,544,456

UNITED STATES PATENT OFFICE.

MACKINTOSH HUTCHINSON, OF PHILADELPHIA, PENNSYLVANIA.

WOODWORKING MACHINE.

Application filed June 15, 1923. Serial No. 645,668.

*To all whom it may concern:*

Be it known that I, MACKINTOSH HUTCHINSON, a subject of the King of Great Britain, residing at Philadelphia, in the county of Philadelphia and State of Pennsylvania, have invented certain new and useful Improvements in Woodworking Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to woodworking machines, particularly of the type embodying a traveling carriage carrying a cross-cut saw and a work table supported from a post and one adapted to swing in a horizontal plane relatively to the other whereby the saw may cut the work on the table at different angles according to the character of the work to be done.

It has for its primary object to construct a machine of the character mentioned in which the saw or working tool will be operated or driven from a gas engine or other source of power positioned or located otherwise than on the traveling carriage and in which slack in the power transmission means between the traveling carriage and the source of power will be automatically taken-up in the travel of the saw carriage. It has further for its object to provide improved features of construction and relative arrangement of parts in a machine of the character indicated whereby advantages are obtained in a machine embodying features of the present invention.

To the accomplishment of the foregoing and such other objects as may hereinafter appear the invention consists in the features hereinafter particularly described and then sought to be clearly defined by the claims, reference being had to the accompanying drawings forming a part hereof, and in which Figure 1 is a side elevation of the machine, showing the position of parts in driving the cross-cut saw;

Figure 2 a plan view, showing position of parts in driving a rip saw;

Figure 3 is a plan view showing position of parts in driving the cross-cut saw;

Figure 1:
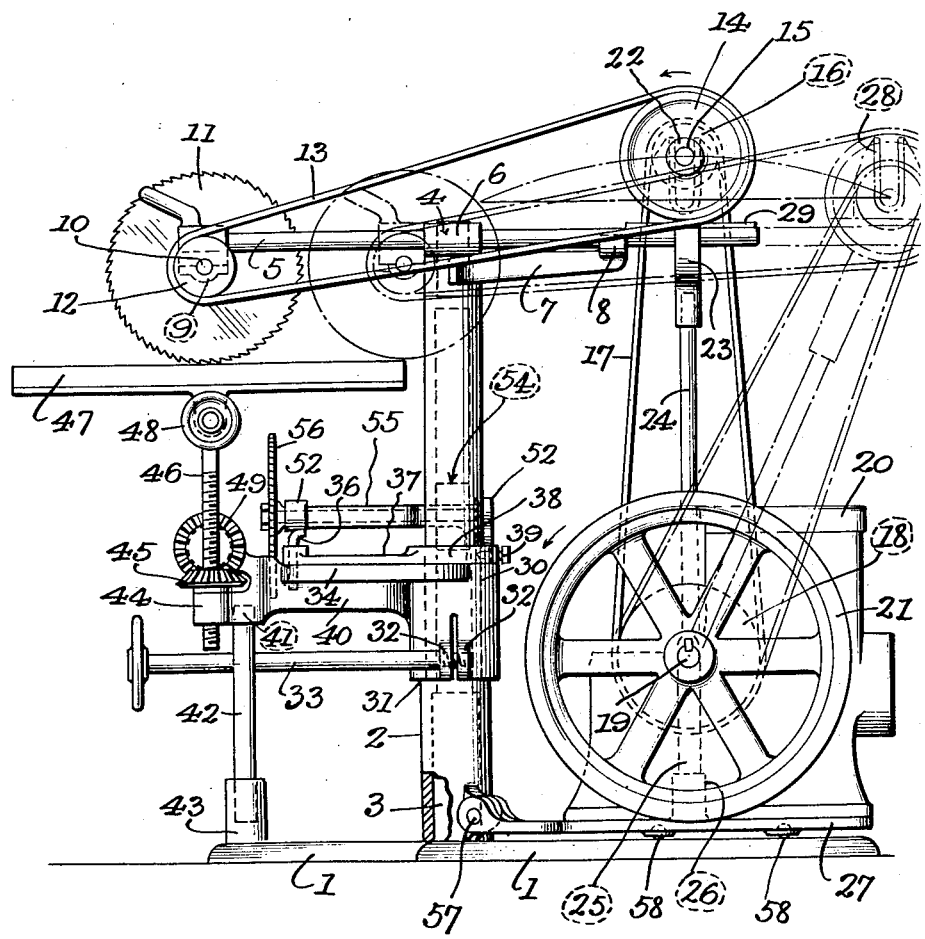

In the drawing, the numeral 1 designates a suitable base from which rises a post 2, preferably tubular, and which may be steadied in its upright position by an upright core 3 rigidly attached in any suitable manner to the base 1. The upper end of post 2 has attached to it in any suitable manner what will for convenience be designated a head block 4, for instance by reducing the upper end of the post and fitting the block onto the reduced end and securing it by a lock bolt or screw or otherwise. The head block is formed with a sleeve serving as a guide for a longitudinal rod of the traveling carriage, and if the carriage in its preferred form consists of two parallel rods 5 as illustrated the head will have a guide sleeve 6 for each rod as shown, and a bracket or brackets 7 may extend from the head-block 4 and have sleeves 8 to receive the rods of the carriage so as to constitute rails to steady the carriage in its back and forth travel.

Figure 2:
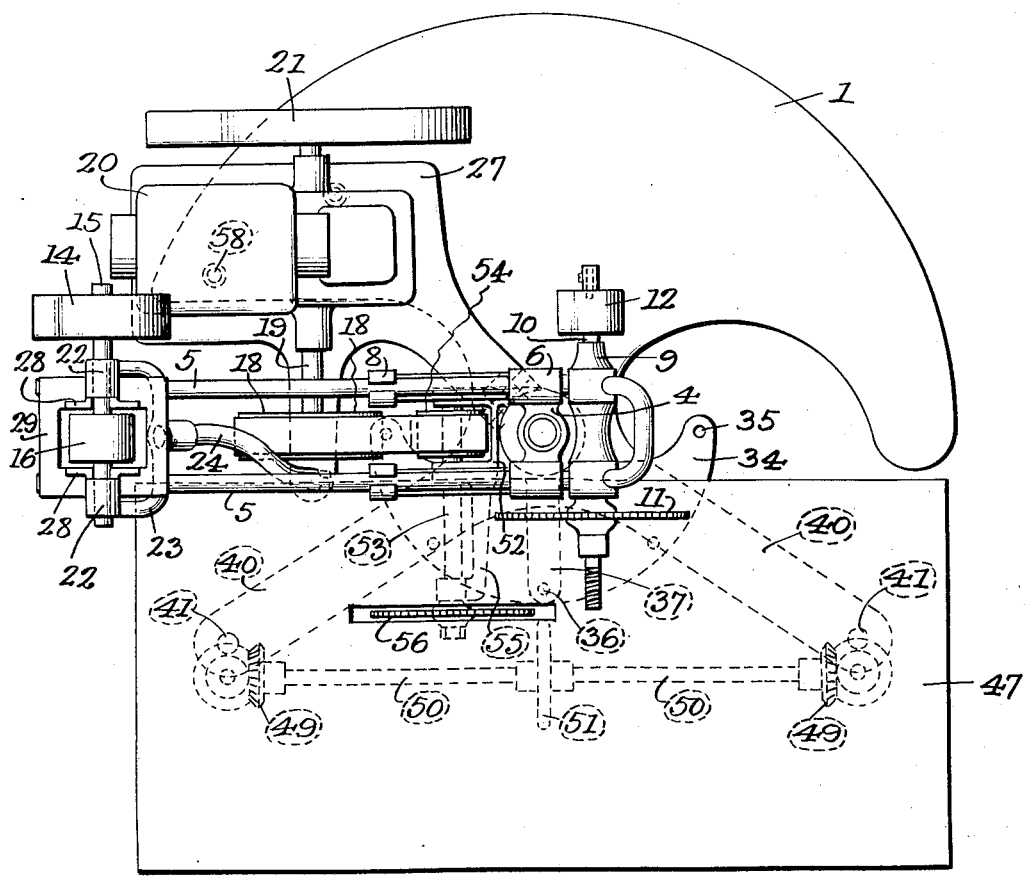

The carriage supports at one end in suitable boxings 9 a saw mandrel 10 provided with a cross-cut saw 11 and carrying a pulley 12 from which a belt 13 passes to and around a pulley 14 on a shaft 15 which also carries a pulley 16 from which a belt 17 extends to and around a pulley 18 on a shaft 19 driven from a suitable source of power which as illustrated in Figures 1 to 3 may be a suitable engine 20, gas or otherwise, so that power will be transmitted from its source through the gearing mentioned to the cross-cut saw; and the shaft 19 may have a fly wheel 21 thereon. The shaft 15 of pulleys 14 and 16 is journaled in boxings 22 of a yoke 23 carried by an arm 24 swiveled or hinged in a suitable manner, say to the upper end of a post 25 fitting in a socket 26 carried by the base-plate 27 of the engine 20, so that the arm 24 will swing in an arc in the travel of the saw-carriage and thus provide for taking-up the slack in belt 17 under different positions of the pulleys 14 and 16 in the travel of the saw carriage. The shaft 15 which carries the pulleys 14 and 16 is guided in its movement from one horizontal plane to another in the swing of the arm 24 by forked or slotted brackets 28 which rise from a base plate 29 attached to the traveling carriage, the shaft sliding in the fork or slot of the brackets and the brackets serving to limit the swing of the arm, and thus easy movement of the carriage back and forth and proper relative positioning of the parts maintained.

The upright post 2 is encircled by a loose fitting split sleeve 30 which rests on a shoulder 31 formed on the post and it is formed with threaded lugs 32 through which passes a threaded rod 33 by which the sleeve may be contracted so as to clamp the post and hold it in the position to which it may be rotatively adjusted in setting the cross-cut saw to the angle at which it is to cut. From this sleeve extends a plate 34 formed with a number of perforations 35 designed to receive in any selected perforation a detachable pin 36 which passes also through an index finger 37 projecting from a collar 38 held by a set screw 39 to the post 2 so as to turn therewith, the finger and perforated plate serving as a scale to determine the angular adjustment of the saw. From the split sleeve 30 also extend two arms 40 formed near their outer ends with sockets 41 in which fit the upper ends of posts 42 and which at their lower ends fit in sockets 43 projecting upward from the base plate 1 and which serve to stabilize the outer ends of arms 40 under the weight which they sustain. The outer ends of the arms 40 are formed with bearings or boxings 44 which support bevel pinions 45 through which and the boxings pass threaded rods 46 which support at their upper ends a work table 47 which may be tiltable and held to its position by a suitable clamping means 48. With the pinions 45 mesh pinions 49 carried by a two-part cross-shaft 50 provided with an operating hand-wheel 51, the cross-shaft to be supported in any well known suitable manner not necessary to illustrate, and by turning the cross-shaft the table may be raised or lowered.

From the sleeve 30 also extends a bracket 52 in which is journaled an arbor or shaft 53 having a pulley 54 attached to one end and its other end journaled in an arm 55 projecting from the bracket 52 and carrying a rip-saw 56.

The platform 27 on which the motor or engine 20 rests is hinged at 57 to the post 2 so as to be swung with the post and for easy movement is provided with ball or other suitable casters 58.

In operation of the machine constructed as described the parts will stand as illustrated in Figure 1 and as the saw carriage is moved rearward the carriage and power transmission means assume the position indicated in dotted lines in that figure and when moved forward to the limit of its forward movement will assume a position forward of the full line position shown in the same figure as will be obvious to the skilled in the art, and in the intermediate or central position the parts will stand as shown in full lines in the figure. When the saw is to cut at an angle to the position shown in Figure 1, the sleeve 30 is spread by the rod 33 from its clamping position and the post rotated to carry the saw to the angle desired and as the post turns to swing the carriage and saw to the position desired the engine carried by the platform connected to the post swings to a corresponding degree so as to maintain the parts in their proper relative positions, and then the sleeve is contracted so as to clamp the post and hold the parts in their adjusted position.

When the rip-saw is to be used, the post is unclamped and the carriage and engine swung to the position indicated by full lines in Figure 2 and the parts clamped in that position; and a belt is run from the pulley 18 to the pulley 54 of the rip-saw arbor.

Figure 4:
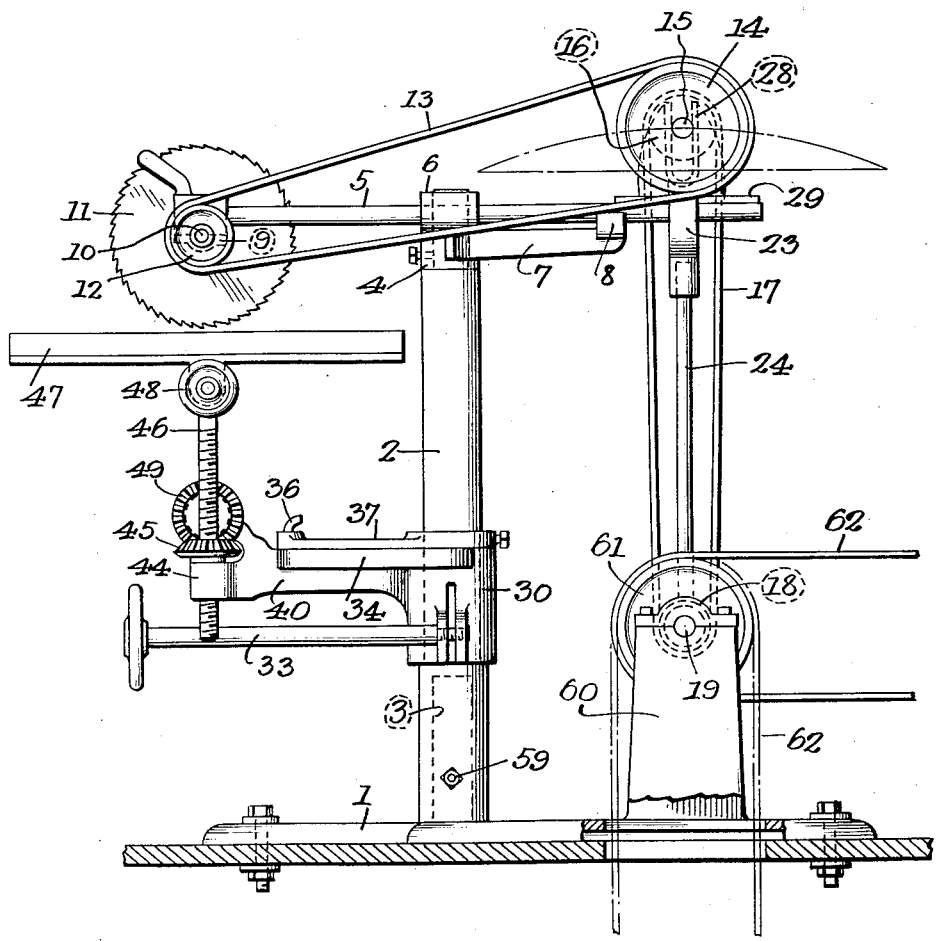
Figure 4 shows a side elevation of a modification in which is shown a line drive either from the floor level or from below, and certain other modifications.

While in the drawings the work table is illustrated as movable up and down between the cross-cut and the rip-saw, the other features of the construction might be used with the table in a fixed or stationary horizontal position and the rip saw made vertically adjustable to bring it within operative relation to the fixed table under any of the well-known constructions practiced for that purpose; or by turning the sleeve from which the rip saw and table are supported, the table and rip saw may be swung horizontally to bring them to one side of the supporting post from beneath the cross-cut saw and then the table lowered to within working range of the rip saw; or if desired the rip saw may be omitted. In the modified form of the machine illustrated in Figure 4 of the drawings, the post 2 is stationary instead of revoluble and so held by a bolt 59 which will secure the post to the core 3 fitting into the lower end of the post which rises from the base plate 1. The sleeve 30 is rotatable on the post and clamped thereto by the rod 33 so as to hold the work table to the horizontal adjustment given to it to present the work to the cross cut saw at the angle at which the work is to be cut, as in this modification the cross-cut saw and its carriage are non-rotatable and stand in a fixed relation to the supporting post. In this modification the shaft 19 which carries the pulley 18 from which belt 17 passes to pulley 16, is journaled in a standard 60 rising from base plate 1 and is provided with a pulley 61 around which passes a line drive belt 62 running from a source of power either on the floor level or below the floor level as desired so that power transmission is from a line drive instead of from an engine on the base plate as in the other form; and in this form the arm 24 may be swiveled or loosely pivoted on the shaft 19, or may be swiveled to a separate post as in the other form as may be preferred. Otherwise than as specified the several parts and their mode of operation are substantially as described for the first form, and the same reference numerals are used in the modified form for corresponding parts found in the other form.

I have illustrated and described the preferred details of construction of the various parts but it is to be understood that changes may be made therein and essentials of the main features of the invention be retained.

Having described my invention and set forth its features what I claim is:

1. A wood working machine comprising a traveling carriage carrying at one end a saw, and a work-table, one adapted to swing relatively to the other in a horizontal plane, a swinging arm connected at its upper end with the traveling carriage and adapted to swing in an arc in reciprocation of the carriage, power receiving and transmission means carried by the upper end of the swinging arm, means connecting the power receiving means with a drive member, a guide in which the power receiving and transmission members have a vertical movement in the reciprocation of the carriage, and means connecting the power transmission means with the cross-cut saw.

2. A wood working machine comprising a traveling carriage carrying at one end a saw, and a work table, one adapted to swing relatively to the other in a horizontal plane; a swinging arm provided with a yoke at its upper end, a shaft journaled in the yoke provided with a pulley for belt connection with the arbor of the saw, and with a pulley for belt connection with a drive member, and a member attached to the saw carriage in which the pulley shaft of the yoke arm is free to slide in reciprocation of the saw carriage.

3. A wood working machine comprising a traveling carriage carrying at one end a saw, and a work table, one adapted to swing relatively to the other in a horizontal plane; a post from which the saw carriage and work table are supported; a split sleeve encircling the post and having the work table connected therewith; means for clamping the sleeve to the post; a swinging arm carrying at its upper end power receiving means connected with a drive member and power transmission means connected with the arbor of the saw, and means connecting the arm with the carriage at the point of location of the power receiving and transmission means for swinging the arm in an arc in reciprocation of the carriage.

4. A wood working machine comprising a traveling carriage carrying at one end a cross-cut saw, and a work table, one adapted to swing relatively to the other in a horizontal plane; a post from which the saw carriage and work table are supported; a split sleeve encircling the post and having the work table connected therewith; means for supporting a rip saw from the sleeve; means for clamping the sleeve to the post; a swinging arm carrying at its upper end power receiving means connected with a drive member and power transmission means connected with the arbor of the cross-cut saw; means connecting the arm with the carriage for swinging the arm in an arc in reciprocation of the carriage; and means for connecting the arbor of the rip saw with power transmission means when brought into alinement therewith.

5. A wood working machine comprising a rotatable post; a traveling carriage supported by the post and provided at one end with a cross-cut saw; a split sleeve encircling the post and supporting a rip saw arbor; means for clamping the sleeve to hold the post against rotation; a swinging arm connected at its upper end with the traveling carriage and carrying power transmission means connected with the arbor of the cross-cut saw and power receiving means, a motor provided with a drive-transmission member connected with the power receiving means at the upper end of the swinging arm, and means connecting said motor with the rotatable post to swing the motor in rotation of the post to bring the arbor of the rip saw and means for transmission of power from the motor into alinement for operating the rip saw.

In testimony whereof I affix my signature in presence of two witnesses.

MACKINTOSH HUTCHINSON.

Witnesses:
 HAROLD J. STOLL,
 DANIEL HUMPHRIES.